(12) United States Patent
Stanglmaier

(10) Patent No.: US 6,679,224 B2
(45) Date of Patent: Jan. 20, 2004

(54) METHOD AND APPARATUS FOR OPERATING A DIESEL ENGINE UNDER STOICHIOMETRIC OR SLIGHTLY FUEL-RICH CONDITIONS

(75) Inventor: Rudolf H. Stanglmaier, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 146 days.

(21) Appl. No.: 09/992,373

(22) Filed: Nov. 6, 2001

(65) Prior Publication Data

US 2003/0084876 A1 May 8, 2003

(51) Int. Cl.[7] .................................................. F02B 7/06
(52) U.S. Cl. ................... 123/431; 123/526; 123/568.12
(58) Field of Search .......................... 123/27 GE, 525, 123/526, 575, 299, 541, 557, 431, 443, 568.12

(56) References Cited

U.S. PATENT DOCUMENTS

| | | | | |
|---|---|---|---|---|
| 3,895,618 A | * | 7/1975 | Cerf ............................ | 123/304 |
| 3,945,352 A | * | 3/1976 | Reimuller ................... | 123/557 |
| 4,513,727 A | * | 4/1985 | Lagano et al. ............. | 123/525 |
| 5,050,550 A | * | 9/1991 | Gao ............................ | 123/275 |
| 5,343,702 A | * | 9/1994 | Miyajima et al. ........... | 60/285 |
| 5,357,908 A | | 10/1994 | Sung et al. | |
| 5,450,722 A | | 9/1995 | Takeshima et al. | |
| 5,450,829 A | * | 9/1995 | Beck ........................... | 123/435 |
| 5,732,554 A | | 3/1998 | Sasaki et al. | |
| 5,775,308 A | * | 7/1998 | Headley ...................... | 123/549 |
| 5,839,275 A | | 11/1998 | Hirota et al. | |
| 5,875,743 A | * | 3/1999 | Dickey ........................ | 123/25 C |
| 6,082,325 A | | 7/2000 | Digeser et al. | |
| 6,119,637 A | | 9/2000 | Matthews et al. | |
| 6,134,883 A | | 10/2000 | Kato et al. | |
| 6,332,448 B1 | * | 12/2001 | Ilyama et al. ............... | 123/304 |
| 6,378,489 B1 | * | 4/2002 | Stanglmaier et al. ........ | 123/304 |
| 6,390,076 B2 | * | 5/2002 | Hunt ........................... | 123/549 |
| 6,550,430 B2 | * | 4/2003 | Gray ........................... | 123/27 GE |
| 6,557,520 B2 | * | 5/2003 | Roberts, Jr. ................. | 123/276 |

* cited by examiner

*Primary Examiner*—Mahmoud Gimie
*Assistant Examiner*—Hai Huynh
(74) *Attorney, Agent, or Firm*—Gunn & Lee, P.C.

(57) ABSTRACT

A method and apparatus for operating a diesel engine under stoichiometric or slightly fuel-rich conditions, as is often necessary to maintain effective operation of certain post-combustion emission reduction devices, such as Lean NOx Traps, includes a readily vaporizable fuel injection nozzle disposed in the intake manifold system in communication with a combustion chamber of the diesel engine. The readily vaporizable fuel mixes with the intake air and produces a mixture of pre-mixed air and fuel when introduced into the combustion chamber. A diesel fuel, which is directly injected into the combustion chamber through a conventional diesel fuel injection nozzle. Combustion of the pre-mixed air and readily vaporizable fuel, with controlled injected of the diesel fuel, reduces the particulate matter (soot) emissions when operating the engine under the necessary stoichiometric or slightly fuel-rich conditions.

19 Claims, 3 Drawing Sheets

METHOD AND APPARATUS FOR OPERATING A DIESEL ENGINE UNDER STOICHIOMETRIC OR SLIGHTLY FUEL-RICH CONDITIONS

BACKGROUND OF THE INVENTION

1. Technical Field

This invention relates generally to a method and apparatus for reducing particulate matter, such as smoke emissions, from the exhaust of a diesel engine, and more particularly to such a method and apparatus for reducing particulate emissions under stoichiometric or slightly rich operating conditions.

2. Background Art

Worldwide emissions regulations slated for introduction during the next five to ten years will require that diesel engines be equipped with some form of exhaust after-treatment device. Perhaps of most concern to the diesel engine industry are the proposed reductions in NOx emissions, because they are the most difficult to mitigate from the exhaust stream of fuel-lean combustion. One of the most promising technologies for NOx after-treatment in diesel engines is the "Lean NOx Trap" (LNT). However, these devices generally require that products of fuel-rich combustion be passed through the catalyst periodically in order to regenerate the NOx trapping sites and convert the released NOx into $N_2$ and $CO_2$.

For example, U.S. Pat. No. 5,450,722, issued Sep. 19, 1995 to Shinichi Takeshima, et al., describes a method of NOx purification with a Lean NOx Trap (LNT) or NOx absorber. The LNT absorbs NOx during lean engine operation and desorbs and reduces the adsorbed NOx during fuel-rich operation of the engine. Similarly, U.S. Pat. No. 5,732,554, issued Mar. 31, 1998 to Shizuo Sasaki, et al., describes a device for operating a diesel engine under stoichiometric or fuel-rich conditions for the purpose of regenerating a NOx adsorber. This device involves changing the in-cylinder air motion, increasing the exhaust gas recirculation (EGR) rate, and using an in-cylinder injector to introduce the fuel in such a way as to generate a pre-mix charge prior to combustion. More recently, U.S. Pat. No. 6,082,325, issued Jul. 4, 2000 to Steffen Digeser, et al., also describes a method and system for operating a diesel engine under stoichiometric or fuel-rich conditions for the purpose of regenerating a NOx adsorber. This method and system involves changing the in-cylinder injection timing to introduce the fuel in such a manner as to generate a low-smoke rich combustion.

Other proposals for operating a diesel engine under stoichiometric or fuel-rich conditions are described in U.S. Pat. No. 5,839,275, issued Nov. 24, 1998 to Shinya Hirota, et al., and in U.S. Pat. No. 6,134,883, issued Oct. 24, 2000 to Nobuhyde Kato, et al. The Hirota, et al. patent describes a method of using multiple in-cylinder injection events to introduce the fuel in such a way as to generate stoichiometric or rich combustion. The Kato, et al. patent describes a method for determining when a NOx adsorber should be regenerated, and for assessing deterioration in the after-treatment system. This patent does not teach how an engine should be operated rich, but rather a method for determining when it should be run rich and for how long.

The above patents describe several proposals for lean NOx trap regeneration. LNT regeneration is one of the main reasons why it would be highly desirable to operate diesel engines temporarily under stoichiometric or slightly fuel-rich conditions. However, diesel combustion is very poorly suited to stoichiometric (air to fuel ratio of about 14.5:1) combustion, as it has a tendency to generate exponentially larger amounts of smoke as the A/F ratio is decreased below about 24:1 (depending upon the engine speed and engine design). The high smoking tendency of diesel engines stems from the poor air utilization of the combustion system, as the injected fuel is unable to mix with all of the air available within the combustion chamber. As a result, very fuel-rich combustion occurs locally and soot particles agglomerate easily to form visible smoke. In modern diesel engines, the smoke emissions generated at A/F ratios approaching stoichiometric are so high that it is simply not feasible to use the above proposed techniques to regenerate an LNT. In addition, U.S. Pat. No. 5,357,908 issued Oct. 25, 1994 to Shiang Sung, et al., describes a method and apparatus for separation of the light ends of a liquid fuel, as proposed as part of one embodiment of the present invention. The Sung, et al. patent proposes the use of the light components of the liquid fuel during engine starting and warm-up, and does not suggest the use of a separated fuel for operation of a compression ignition engine during stoichiometric or fuel-rich conditions.

The present invention is directed to overcoming the problems set forth above. It is highly desirable to have a method and system for temporarily operating a diesel engine under stoichiometric, or even slightly fuel-rich conditions, but with low or moderate smoke emissions. The present invention advantageously provides a means for regenerating an LNT without introducing unburned fuel into the exhaust stream of the to engine, or requiring any additional substances for operating the engine or after-treatment device.

SUMMARY OF THE INVENTION

In one aspect of the present invention, a method for operating a diesel engine under stoichiometric or slightly fuel-rich conditions includes providing a source of diesel fuel and a source of a second fuel that is readily vaporizable in an intake manifold system of the diesel engine. The second fuel is controllably introduced into the intake manifold system and mixed with air when the engine is operating under either stoichiometric or fuel-rich operating conditions, thereby providing a pre-mixed fuel mixture combining air and the readily vaporizable second fuel that is introduced into a combustion chamber of the diesel engine. The diesel fuel is then controllably introduced into the combustion chamber through an injector nozzle disposed in the combustion chamber. The diesel fuel and the readily vaporizable second fuel mixture are then combusted in the combustion chamber of the diesel engine.

In another aspect of the present invention, an apparatus for operating a diesel engine under stoichiometric or slightly rich conditions, in which the diesel engine has at least one combustion chamber, and an air intake system and an exhaust gas system in communication with the combustion chamber, includes a first injection nozzle disposed in the combustion chamber of the engine and a second injection nozzle disposed in the air intake system of the engine. The first injection nozzle is in communication with a source of diesel fuel, and the second injection nozzle is in fluid communication with a second fuel that is readily vaporizable in the air intake system. At least one sensor is provided for sensing the relative ratio of the air/fuel mixture introduced into the combustion chamber. A controller, in communication with the sensor and with the first and second fuel injection nozzles, controls the injection of the diesel fuel through the first injection nozzle and the injection of the readily vaporizable second fuel through the second injection nozzle in response to the controller determining that the fuel/air mixture in the combustion chamber is either a stoichiometric or a fuel-rich mixture.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EMBODIMENTS

The present invention is directed to a method and apparatus for temporarily operating a diesel engine under stoichiometric or even slightly fuel-rich conditions with low or moderate smoke emissions. Moreover, the present invention provides a means for regenerating a Lean NOx Trap (LNT) without introducing unburned fuel into the exhaust system of the engine or requiring any additional substances for operating the engine or after-treatment device.

Figure 2:
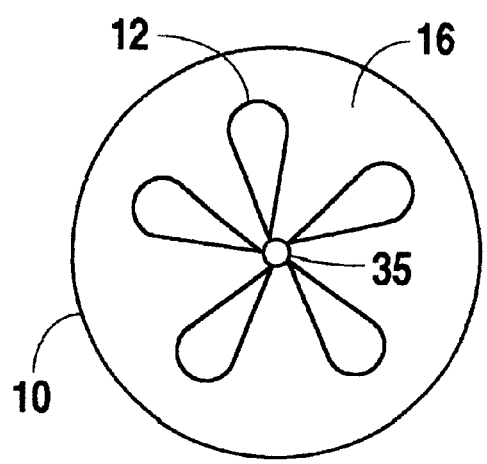
FIG. 2 is an illustration of the distribution of a port injected, readily vaporizable fuel pre-mixed with air, and the diesel fuel distribution from an injection nozzle disposed in the combustion chamber, prior to combustion in accordance with the present invention.
Figure 3:
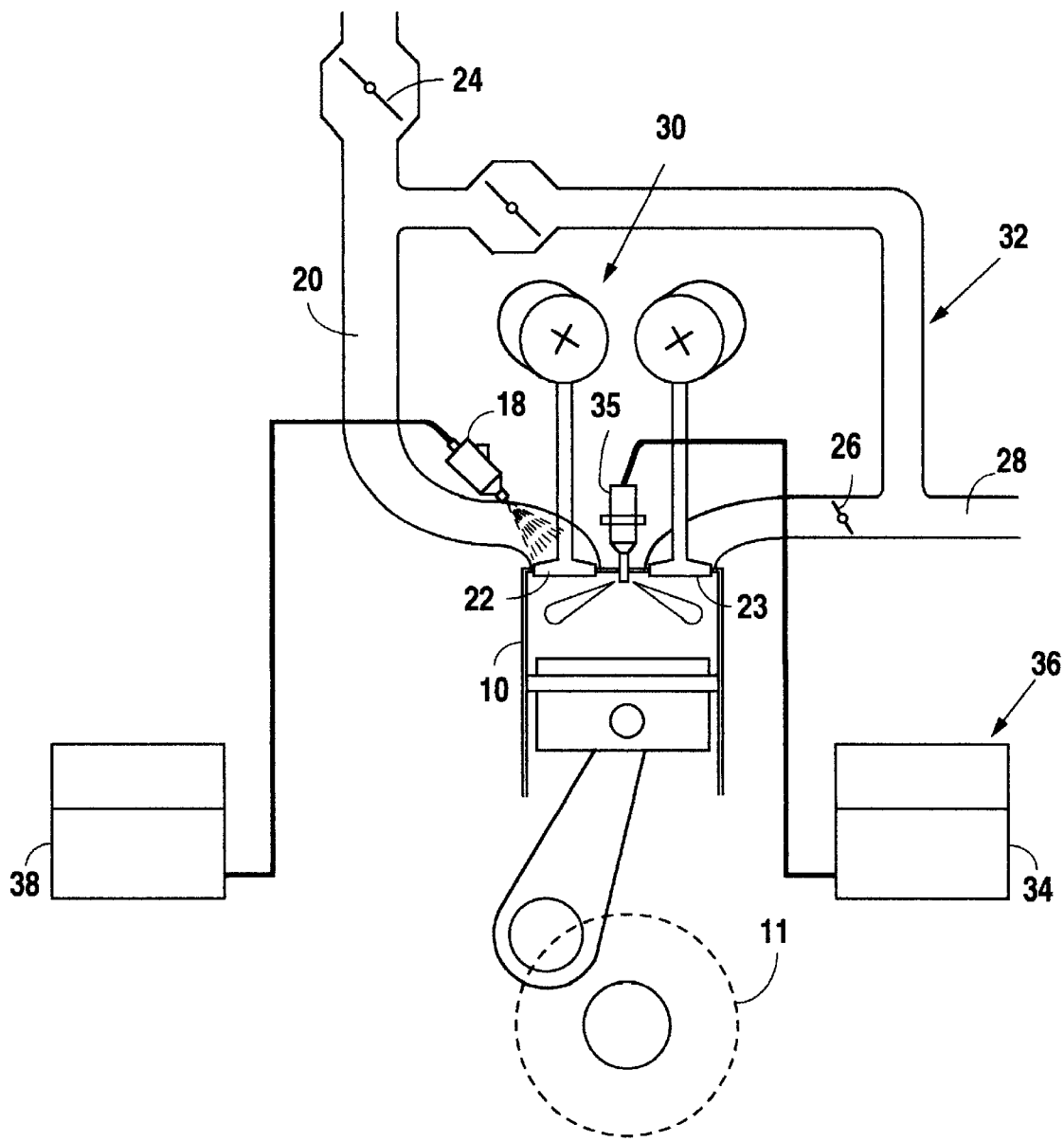
FIG. 3 is a schematic representation of a diesel engine having an apparatus for operating a diesel engine under stoichiometric or slightly fuel-rich conditions, in accordance with the present invention.
Figure 4:
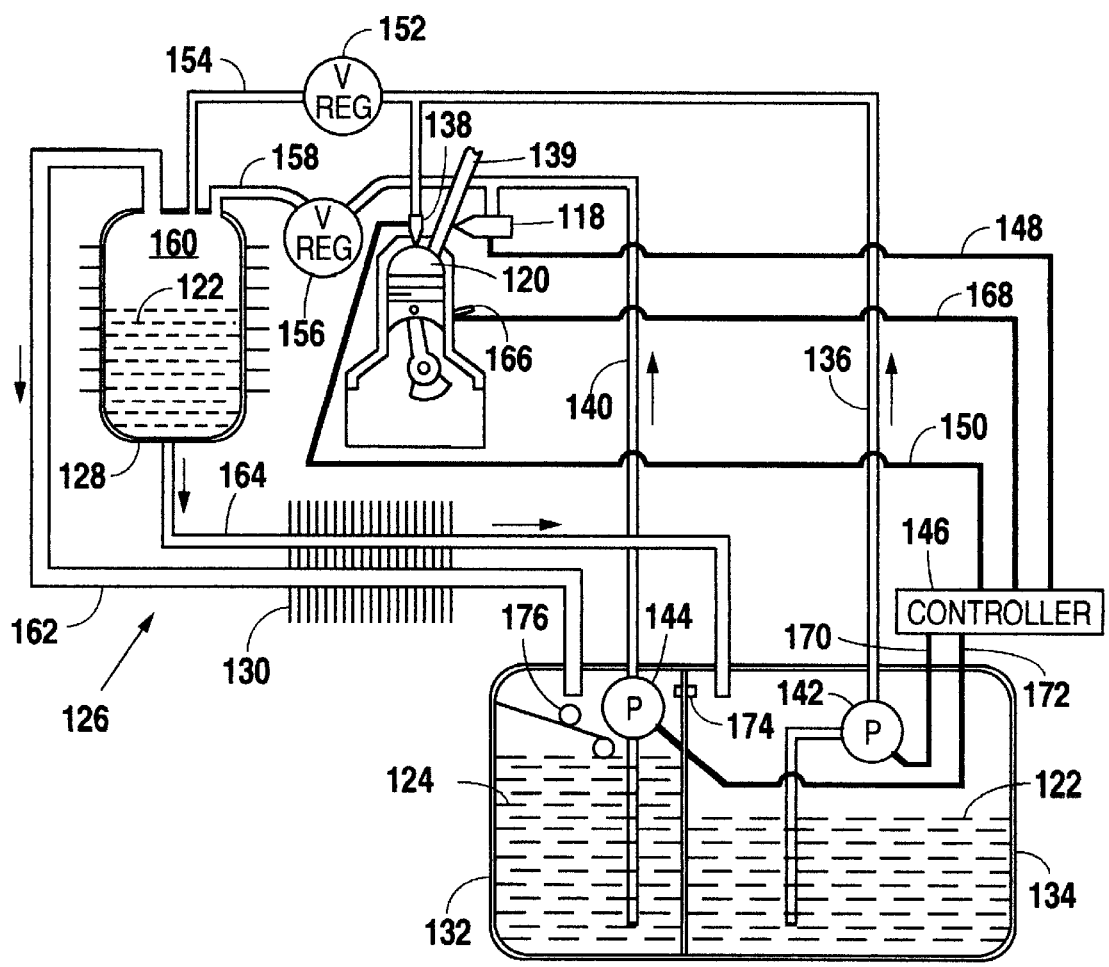
FIG. 4 is a schematic representation of a distilation system for producing a readily vaporizable second fuel for pre-mixing with air in an air intake system of a diesel engine, and introducing the pre-mixed readily vaporizable second fuel and a primary fuel into the combustion chamber of the engine when the diesel engine is operating under stoichiometric or slightly fuel-rich conditions, in accordance with another aspect of the present invention.

In a preferred embodiment of the present invention, a method for mitigating smoke emissions from diesel combustion by pre-mixing a portion of the fuel with air prior to the primary diesel fuel injection, is described with reference to FIGS. 1, 2 and 3. In an alternate embodiment, a method for generating a fuel that can be readily vaporized in the intake manifold of a diesel engine and introduced into the combustion chamber before the combustion event, is illustrated in FIG. 4.

Conventional diesel combustion is poorly suited to stoichiometric or rich operation because it has a very high tendency to produce soot and smoke emissions as the air to fuel (A/F) ratio is reduced below 24:1 (depending on the engine design and speed). This is because the injected air is unable to mix with all of the air available within the combustion chamber, and very rich combustion occurs on the periphery of the fuel jets. As illustrated in FIG. 1, all of the fuel is injected into the chamber through a fuel injector in communication with the combustion chamber, resulting in fairly large jets having large peripheral areas at which combustion initially occurs, and the fuel is thereby unable to completely mix with all of the air available within the combustion chamber prior to combustion.

Figure 1:
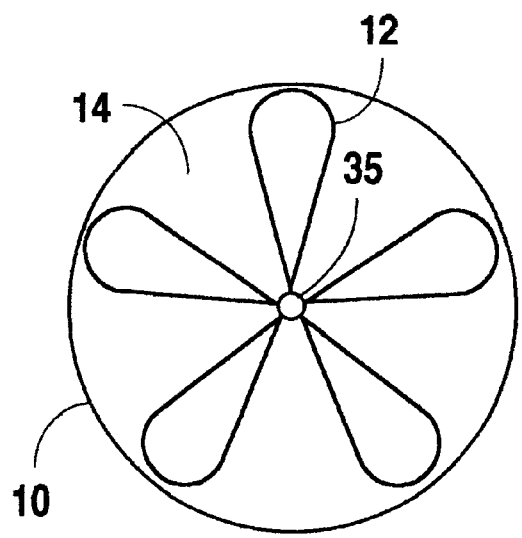
FIG. 1 is an illustration of diesel fuel distribution from an injection nozzle disposed in a combustion chamber of a diesel engine prior to conventional diesel combustion.

A representative illustration of the above-described conventional diesel fuel injection is shown in FIG. 1. A combustion chamber is represented by the reference numeral 10, the diesel fuel discharged through the jets of an injector 35 are referenced by the reference numeral 12, and the air introduced into the combustion chamber 10 is indicated by the reference numeral 14.

It has been known that pre-mixing a fraction of the fuel with air, prior to the primary diesel fuel injection and combustion events, can result in a large reduction in smoke and particulate matter emissions. This arrangement is illustrated in FIG. 2, in which the jets of fuel 12 injected through the primary injection nozzle 35 into the combustion chamber 10 are much smaller and the remainder of the chamber 10 is filled with a pre-mixed air and fuel mixture 16. Generally, pre-mixed air and fuel has not been used for lean engine operation for the following reasons:

(1) Emissions of unburned hydrocarbons (HC) and carbon monoxide (CO) increase;
(2) Other means of achieving particulate matter (PM) exhaust emission levels that comply with the legislative limits have been found until now; and
(3) Partially pre-mixed diesel combustion is less fuel-efficient than conventional diesel combustion.

Another crucial factor is that partially pre-mixed air and fuel diesel combustion requires a fuel that can be readily vaporized under intake manifold conditions. Volatility of diesel fuel is generally too low to be vaporized under intake manifold conditions.

In the preferred embodiment of the present invention, partially pre-mixed diesel combustion is used to operate a diesel engine under stoichiometric or slightly rich conditions, but without generating unacceptably high levels of smoke or particulate matter (PM) emissions. The preferred embodiment of this invention is illustrated schematically in FIG. 3, and uses port-fuel injection or other upstream fuel supply system to introduce some fraction of the total fuel mixed with the intake air prior to introducing the air-fuel mixture into the combustion chamber 10 of a diesel engine 11. In FIG. 3, a port fuel injector 18 is positioned in an intake manifold system 20 at a position upstream of an intake valve 22 of the combustion chamber 10. An exhaust valve 23, through which exhaust gases are discharged, is also in direct communication with the combustion chamber 10.

In order to operate a diesel engine under stoichiometric or slightly rich conditions without exceeding the operating design parameters of the engine, it is most likely necessary to reduce the airflow of the engine 11. In one embodiment of this invention, airflow to the engine 11 is accomplished by a throttle 24 or other restriction in the intake system 20. Other embodiments of controlling airflow reduction through the engine 11 include a throttle 26 in an exhaust system 28, or use of a variable valve actuation (VVA) system, generally indicated by the reference numeral 30, to control airflow through the engine by altering the intake and/or the exhaust valve operation, as illustrated in FIG. 3. In addition, the use of exhaust gas recirculation (EGR) into the intake manifold system 20 can also be used to replace some of the fresh air charge, or used in addition to the devices described above. The exhaust gas recirculation system is generally indicated by the reference numeral 32.

The primary fuel, an appropriate diesel fuel 34, is injected directly into the combustion chamber 10 through a conventional fuel injector 35 having a nozzle portion disposed in the combustion chamber 10. The supply of diesel fuel 34 is generally indicated by the reference numeral 36. In the present invention, a second fuel 38 that is readily vaporizable in the intake manifold system 20, is injected through a port fuel injector 18. The pre-mixed portion of the readily vaporized fuel 38 can be of various types. That is, it is possible to partially pre-mix a readily vaporizable, e.g., a very finely atomized or distilled portion of the diesel fuel 34 that is used for conventional engine operation with air, or it is possible to use a separate and independent fuel supply such as gasoline, natural gas, liquified petroleum gas (LPG), hydrogen or other readily vaporizable and combustible substance.

An alternate embodiment provides a readily vaporizable, more volatile, fraction 124 of a diesel fuel 122 that can be extracted by partial distillation, as illustrated in FIG. 4 and described below in greater detail.

As noted above, port injection or upstream mixing of conventional diesel fuel 34 poses a significant problem because the volatility of diesel fuel is too low to vaporize under intake manifold conditions. However, it is undesirable from a practicality standpoint to require two different fuels for operation of an engine. In the alternate embodiment of the present invention, illustrated in FIG. 4, the most volatile fraction 124 of the diesel fuel 122 is extracted, and that fraction is used for pre-mixing with air in the air intake system. During normal operation, only diesel fuel 122 is introduced into a combustion chamber 120 through a conventional diesel fuel injector 138.

In the alternate embodiment of the present invention, illustrated in FIG. 4, a method and apparatus for generating two or more fuels 122, 124 with different properties from a single multi-component parent fuel 122 is illustrated. In carrying out the method embodying the alternate embodiment, two or more fuels 122, 124 with different properties are used to fuel the engine under stoichiometric or slightly fuel-rich conditions, such as may be encountered during Lean NOx Trap regeneration. In the illustrated alternate embodiment, the process of distillation is used to separate a fraction, or component, 124 of the primary diesel fuel 122 according to volatility and its ability to be readily vaporized in the air intake system 139 of the engine. That is, a more vaporizable component 124 of the parent fuel 122 is separated by vaporizing a portion of the parent diesel fuel 122 and re-condensing the separated more readily vaporizable portion 124 for separate storage and use. Thus, in accordance with the alternate embodiment, the process of distillation is used to generate two or more fuels 122, 124 having different tendencies to vaporize, which in carrying out the method and the apparatus of the preferred embodiment of the present invention, can in turn be used to introduce the more readily vaporizable, distilled, fraction 124 directly into the intake manifold system 139, and thereby provide a pre-mixed air/fuel mixture to control the combustion characteristics of a compression-ignition engine under stoichiometric or slightly fuel-rich conditions.

In the alternate embodiment of the present invention, the fuel distillation process is desirably performed on a vehicle, not shown, with the use of an on-board distillation system, generally indicated by the reference numeral 126, and illustrated schematically in FIG. 4. Before turning to a description of the on-board distillation system 126, it should be noted that if desired, the distillation could be performed outside the vehicle at a stationary location, and then stored in separate storage containers on the vehicle.

The basic elements of the on-board distillation system 126 include an evaporator 128, a condenser 130, and a separate tank 132 for the extracted readily vaporizable fuel 124. More specifically, with continued reference to FIG. 4, the on-board distillation system 126 also includes a primary fuel tank 134 in which the parent diesel fuel 122 is stored. The primary diesel fuel tank 134 supplies a pressurized flow of the diesel fuel 122 to a fuel injector 138 by a fuel supply line 136. A pressurized flow of the readily vaporizable second distilled fuel 124 is provided to a port fuel injector 118, disposed in an air intake manifold 139, by a separate fuel supply line 140 extending from a fuel tank 132, containing the distilled readily vaporizable fuel component 124, to the port fuel injector 118. The diesel fuel line 136 is pressurized by a first fuel pump 142 and the second, or readily vaporizable fuel line 140, is pressurized by a second fuel pump 144. Control signals for the operation of the first and second fuel pumps 142, 144 to supply pressurized fuel to the respective fuel injectors 138, 118 are provided by an electronic engine controller (EEC) 146 by way of electrical signals 150 and 148, respectively.

The evaporator, or vapor separator, 128 is desirably positioned on the vehicle in close proximity to the engine. Desirably, to extract the heat required for fuel distillation, the fuel evaporator 128 extracts heat from a conventional exhaust gas recirculation cooler, not shown, disposed in the exhaust gas recirculation system 32, illustrated in FIG. 3. The evaporator 128 is a combination of a fuel vaporizer and a vapor/liquid separator. Diesel fuel 122 is supplied to the vapor separator 128 through a pressure regulator 152 and then through a first overflow fuel line 154. During certain periods of operation, the diesel fuel pump 142, controlled by an electrical signal 170 from the engine controller 146, supplies more diesel fuel 122 through the fuel supply line 136 than is required by the injector 138. Therefore, there will be a surplus flow of the diesel fuel 122. The surplus diesel fuel 122 is carried by an overflow fuel line 154 to the vapor separator 128. In a similar manner, the readily vaporizable fuel component 124 is supplied to the vapor separator 128 through a pressure regulator 156 and an overflow fuel line 158.

The evaporator, or vapor separator, 128 heats the overflow diesel fuel 122 and the overflow second, or readily vaporizable, fuel component 124 to generate a fuel vapor 160. The fuel vapor 160 is removed from the evaporator 128 by a secondary return line 162, which extends from the evaporator 128 to the fuel tank 132 containing the readily vaporizable fuel component 124. Non-vaporized diesel fuel 122, from which the more readily vaporizable component 124 has been separated, is removed from the evaporator 128 by a primary return line 164, which extends from the evaporator 128 to the diesel fuel tank 134. Preferably, the evaporator 128 is heated to a temperature from about 150° C. to about 250° C. through heat exchange with the engine exhaust gases. The evaporator 128 may be positioned in such close proximity to the engine that it is heated to the desired temperature through direct heat exchange from the engine or engine exhaust gases. In particular, the required heat for the fuel evaporator 128 may be obtained from an exhaust gas recirculation cooler as described above with reference to the EGR system 32 in FIG. 3. This particular component operates at roughly the desired evaporation temperature (approximately 180° C. to approximately 220° C.) for extracting the most volatile, and therefore more vaporizable, 5–10% of diesel fuel.

The condenser 130 cools the fuel vapor 160 to produce a supply of the more readily vaporizable fuel component 124. The condenser 130 is disposed in the return line 162 extending between the fuel vapor chamber 160 of the evaporator 128 and the fuel tank 132. Preferably, the condenser 130 also cools the returned diesel fuel component 122 as it is returned to the diesel fuel tank 134 by passing the primary fuel line 164 through the condenser 130.

Alternatively, if so desired, overflow amounts of the more readily vaporizable fuel 124 may be returned directly from the evaporator 128 to the vaporizable fuel tank 132 without passing through the condensor 130.

The electronic engine controller 146 is capable of not only controlling the opening of the respective fuel flow passages within the respective port and primary fuel injectors 118, 138, but also can control the pulse width or length of the respective fuel injections. The electronic engine controller 146 is in electrical communication with at least one sensor 166 adapted to sense at least one engine operating parameter correlative of the air/fuel ratio of the engine. Electrical communication between the sensor 166 and the electronic engine controller 146 is provided by an electrical signal 168 extending between the sensor 166 and the controller 146. Examples of sensors that are capable of providing the signal correlative of a desired air/fuel ratio include an oxygen sensor disposed in the exhaust system or a mass airflow sensor disposed in the intake manifold 139 and a net fuel flow meter disposed in the diesel fuel supply line 136 and the overflow line 154.

If desired, the vaporizable fuel component 124 may be introduced at alternative locations within the air intake system 139, for example, by throttle body injection or by other commonly known carburation devices upstream of the intake valve of the combustion chamber 120.

Operation of the diesel fuel pump 142 and the vaporizable component fuel pump 144 are respectively controlled by electrical signals 170 and 172 extending between the controller 146 and the respective pumps. If the readily vaporizable fuel component 124 stored within the fuel tank 132 should reach excessively high fuel levels, an overflow valve 174 is provided between the tanks 132 and 134. In addition, a float operated shutoff valve 176 is provided in the fuel tank 132 to inhibit an excess flow of the vaporizable fuel component into the secondary storage tank 132.

A similar on-board fuel distillation system is described in co-pending U.S. application No. 09/864,983, filed on May 24, 2001. The co-pending application was filed by Rudolf H Stanglmaier, et al. Mr. Stanglmaier is the inventor of the present invention, which is also assigned to the same assignee, and describes the use of two fuels having different reactivity characteristics to control the combustion phasing in compression ignition engines.

The apparatus described in both the preferred and alternative embodiments, described above, are advantageously used in carrying out the method for operating a diesel engine under stoichiometric or slightly fuel-rich conditions. The method includes providing a source of fuel suitable for use in a compression ignition engine, such as diesel fuel, and a second source of fuel that is readily vaporizable in the air intake system of the diesel engine. When the engine is operating under a stoichiometric or slightly fuel-rich condition, such as when regenerating a Lean NOx Trap (LNT), the readily vaporizable fuel is introduced into the air intake manifold system where the fuel is mixed with air, thereby providing a pre-mixed fuel mixture comprising air and the vaporized fuel to the combustion chamber. Prior to combustion, the diesel fuel is injected through an injection nozzle that is disposed in direct communication with the combustion chamber of the diesel engine. Thus, prior to combustion, there is both a mixture of pre-mixed readily combustible air and fuel, as well as the primary diesel fuel. The final step in the method comprises combusting the introduced mixture of diesel fuel and pre-mixed air/fuel mixture in the combustion chamber.

As noted above, the output torque of the engine may be controlled by throttling the air flow through the engine, such as a restriction, or throttle, in the intake manifold system or in the exhaust system. Also, exhaust gas recirculation rate may be controlled to alter the engine output torque. Alternatively, the output torque of the engine may be modified by variable actuation of at least one of the intake valve or the exhaust valve of the combustion chamber.

Readily vaporizable fuels suitable for use in carrying out the method of operating a diesel engine under stoichiometric or slightly fuel-rich conditions include a readily vaporizable, e.g., a very finely atomized or distilled fraction of diesel fuel, gasoline, ethanol, methanol, natural gas, or liquified petroleum gas (LPG). In particular, the alternate embodiment of the method described and claimed herein generates a most volatile fraction of the diesel fuel by partial distillation. Desirably, the distillation system is mounted on the same vehicle as the engine and the distillation process is performed on the vehicle. In particular, the method includes distillation of a parent fuel, such as diesel fuel, by an evaporator and a condenser mounted on the vehicle. Advantageously, the distillation is carried out in an evaporator that is heated by the cooler of an exhaust gas recirculation system disposed on the vehicle and is heated to a temperature from about 180° C. to about 220° C.

INDUSTRIAL APPLICABILITY

The present invention provides a means for operating a diesel engine under stoichiometric or slightly fuel-rich conditions without generating excessive amounts of smoke and particulate matter. Temporary engine operation under stoichiometric or slightly fuel-rich conditions is required by some exhaust after-treatment technologies, such as the regeneration of Lean NOx Traps, and there is currently no other acceptable means of achieving this on a diesel engine.

In the preferred embodiment, the present invention provides both a method and an apparatus for generating the exhaust gas composition necessary for maintaining effective operation of certain post-combustion emissions reduction devices, such as LNTs, which minimizes soot production with the use of, in an alternative embodiment, a single parent fuel. Thus, the present invention enables the after-treatment of exhaust gas from a diesel engine with a Lean NOx Trap in a manner that is completely transparent to the engine operator, and greatly enhances the ability to operate the engine under ever-increasingly stringent emission standards.

What is claimed is:

1. A method for operating a diesel engine under stoichiometric or slightly fuel-rich conditions includes:

providing a source of diesel fuel;

providing a source of a second fuel that is readily vaporizable in an air intake section of the diesel engine;

controllably introducing said readily vaporizable second fuel into said intake manifold system when said engine is operating under one of a stoichiometric and a fuel-rich operating condition, thereby providing a pre-mixed air/fuel mixture comprising air and said readily vaporizable second fuel;

introducing said pre-mixed fuel into a combustion chamber of said engine;

injecting said diesel fuel through an injection nozzle disposed in the combustion chamber of the diesel engine; and combusting said diesel fuel and said readily vaporizable second pre-mixed air/fuel mixture in said combustion chamber.

2. The method, for operating a diesel engine under stoichiometric or slightly fuel-rich conditions, as set forth in claim 1, wherein the torque output of said diesel engine is controlled by modulation of a restriction in the air intake system of said engine.

3. The method, for operating a diesel engine under stoichiometric or slightly fuel-rich conditions, as set forth in claim 1, wherein the torque output of said diesel engine is controlled by modulation of a restriction in an exhaust system of said engine.

4. The method, for operating a diesel engine under stoichiometric or slightly fuel-rich conditions, as set forth in claim 1, wherein the torque output of said diesel engine is modulated by variable actuation of at least one of an intake valve and an exhaust valve in communication with said combustion chamber.

5. The method, for operating a diesel engine under stoichiometric or slightly fuel-rich conditions, as set forth in claim 1, wherein said second readily vaporizable fuel is selected from the group of fuels consisting of a volatile fraction of diesel fuel, gasoline, ethanol, methanol, natural gas, and liquified petroleum gas.

6. The method, for operating a diesel engine under stoichiometric or slightly fuel-rich conditions, as set forth in claim 5, wherein said second readily vaporizable fuel is generated by separation of the most volatile fraction of diesel fuel by partial distillation.

7. The method, for operating a diesel engine under stoichiometric or slightly fuel-rich conditions, as set forth in claim 6, wherein said diesel engine is mounted on a vehicle and said partial distillation is performed on-board said vehicle.

8. The method, for operating a diesel engine under stoichiometric or slightly fuel-rich conditions, as set forth in claim 7, wherein said distillation is performed by an evaporator and a condenser mounted on said vehicle.

9. The method, for operating a diesel engine under stoichiometric or slightly fuel-rich conditions, as set forth in claim 8, wherein said evaporator is maintained at a temperature of from about 180° C. to about 220° C.

10. The method, for operating a diesel engine under stoichiometric or slightly fuel-rich conditions, as set forth in claim 7, wherein said diesel engine includes an exhaust gas recirculation system having an exhaust gas cooler disposed in said exhaust gas recirculation system, and said method includes heating said evaporator by said exhaust gas recirculation cooler.

11. An apparatus for operating a diesel engine under stoichiometric or slightly fuel-rich conditions, said diesel engine having at least one combustion chamber, and an intake air system and an exhaust gas system in communication with said combustion chamber, wherein said apparatus includes:
   a diesel fuel injection nozzle disposed in said combustion chamber of said engine and in communication with a source of diesel fuel;
   a second injection nozzle disposed in said air intake system in communication with said combustion chamber and in communication with a second fuel that is readily vaporizable in said intake system;
   a sensor for sensing the air/fuel ratio of the air/fuel mixture introduced into said combustion chamber;
   a controller in communication with said sensor and with said diesel fuel and with said second readily vaporizable fuel, said controller controlling the injection of said diesel fuel and said second readily vaporizable fuel through said diesel fuel injection nozzle and said second injection nozzle disposed in the intake system, and injecting the second readily vaporizable fuel through the second injection nozzle disposed in the intake manifold system in response to said controller determining that the air/fuel mixture in said combustion is one of a stoichiometric and a fuel-rich mixture.

12. The apparatus for operating a diesel engine under stoichiometric or slightly fuel-rich conditions, as set forth in claim 11, wherein said apparatus includes a modulatable airflow restrictor disposed in the intake system of said engine, the torque output of said engine being controlled in response to modulating said airflow restrictor disposed in the air intake system.

13. The apparatus for operating a diesel engine under stoichiometric or slightly fuel-rich conditions, as set forth in claim 11, wherein said apparatus includes a modulatable exhaust gas restrictor disposed in the exhaust gas system of said engine, the torque output of said engine being controlled in response to modulating said restrictor disposed in said exhaust gas system.

14. The apparatus for operating a diesel engine under stoichiometric or slightly fuel-rich conditions, as set forth in claim 11, wherein said apparatus includes at least one of a variable intake valve and a variable output valve, in communication with said combustion chamber, the torque output of said engine being controlled in response to modulating at least one of said variable intake valve and said variable exhaust valve.

15. The apparatus for operating a diesel engine under stoichiometric or slightly fuel-rich conditions, as set forth in claim 11, wherein said second readily vaporizable fuel is selected from the group of fuels consisting of a volatile fraction of diesel fuel, gasoline, ethanol, methanol, natural gas, and liquified petroleum gas.

16. The apparatus for operating a diesel engine under stoichiometric or slightly fuel-rich conditions, as set forth in claim 11, wherein said volatile fraction of diesel fuel is a product of partial distillation of diesel fuel.

17. The apparatus for operating a diesel engine under stoichiometric or slightly fuel-rich conditions, as set forth in claim 16, wherein said diesel engine is mounted on a vehicle and said apparatus includes a diesel fuel distillation unit mounted on said vehicle.

18. The apparatus for operating a diesel engine under stoichiometric or slightly fuel-rich conditions, as set forth in claim 17, wherein said distillation unit includes an evaporator and a condenser mounted on said vehicle.

19. The apparatus for operating a diesel engine under stoichiometric or slightly fuel-rich conditions, as set forth in claim 18, wherein said engine includes a controllable exhaust gas recirculation system having an exhaust gas cooler disposed therein and said evaporator is heated by said exhaust gas recirculation cooler.

* * * * *